252. COMPOSITIONS,

99

Patented July 10, 1934

1,966,383

UNITED STATES PATENT OFFICE 1,966,383

PRODUCTION OF AVAILABLE CHLORINE COMPOSITIONS

Harvey G. Elledge and Alfred Hirsch, Painesville, Ohio, assignors to Diamond Alkali Company, Pittsburgh, Pa., a corporation of Delaware No Drawing. Application July 13, 1931, Serial No. 550,615

6 Claims. (Cl. 87—5)

This invention relates to cleansing materials containing available chlorine.

It is among the objects of the invention to provide a sodium silicate composition containing available chlorine, which is solid, readily handled, easily soluble in water, adapted for uses where combined alkaline cleansing and oxidizing actions are desired, is readily prepared by a simple and economical procedure, and possesses sufficient stability for commercial purposes.

Alkaline cleansing or detergent agents are used for many purposes, for instance in laundering, in the washing of dishes, cooking utensils and dairy equipment, and in other similar operations. It is desirable frequently to combine the action of such agents with that of an oxidizing or germicidal agent, such as chlorine. For this purpose there have been used materials containing available chlorine, i. e. materials capable of liberating chlorine easily, for instance bleaching powder.

It has been proposed to provide compositions combining these cleansing and germicidal properties, but the means available heretofore have not been fully satisfactory. For example, the method of production of such compositions has been open to various economic and other disadvantages. Also, although sodium silicate possesses especially desirable alkaline cleansing properties no means has been known for preparing compositions containing it together with available chlorine, and which are dry, readily soluble, and stable enough for commercial purposes.

We have discovered, and it is upon this that our invention is predicated, that satisfactory compositions of the type just described and embodying the objects of the invention may be produced by preparing a suitable solution containing alkali metal silicate and an alkali metal hypochlorite, and solidifying the entire mass. Thus there is obtained a solid, material which is dry to the touch, and composed of a crystallized mass of hydrated alkali metal silicate through which the hypochlorite is dispersed. This composition is readily and completely, or substantially completely, soluble in water, and when dissolved it readily liberates its available chlorine content.

In the preferred embodiment of the invention the sodium meta silicate is used, although the invention is not restricted to the use of any specific sodium silicate, or hydrate thereof. The meta silicate is preferred, however, because it can be readily crystallized, and because its aqueous solutions provide baths whose pH values are desirable for detergent purposes. For this reason the invention will be described particularly with reference to the meta silicate.

In the practice of the invention the meta silicate may be prepared in any suitable manner, as by diluting commercial water glass solution with sodium hydroxide to bring the composition to meta silicate proportions. In order to provide the most stable products the ratio of $Na_2O$ to $SiO_2$ should be between about 1 to 1.02, as we have found that when the ratio falls to about 0.99 the products are less satisfactory. The most satisfactory results are had with a solution of sodium meta silicate containing between about 44 and 60 percent, and most suitably about 53.5 percent, of water, the balance of the solution being sodium silicate.

In accordance with the invention the silicate solution is then provided with sodium hypochlorite in an amount adapted to provide the desired amount of available chlorine, the proportions of the resultant solution being adapted to provide for crystallization of the entire mass. If desired the hypochlorite may be added in the form of a solution, prepared for instance by chlorination of a sodium hydroxide solution in the manner well known in the art.

As a non-restrictive example of the invention there may be described the preparation of a material containing about 1.6 percent of available chlorine. There are first prepared a 46.5 percent solution of sodium meta silicate, and a separate hypochlorite solution containing about 12 percent of sodium hypochlorite, 9.4 percent of sodium chloride, 1 percent of sodium hydroxide, and the balance water. The silicate solution is heated to approximately 50° C. to reduce the viscosity to a minimum consistent with the effect of elevated temperature upon the stability of sodium hypochlorite, and to 6365 parts of this heated solution there are added with intimate mixing 700 parts by weight of the hypochlorite solution. The resultant solution is then crystallized in its entirety. The proportions of water and sodium meta silicate in this solution approximate the composition $Na_2SiO_3.9H_2O$, and crystallization is effected by supercooling to about 30° C., when the mass is seeded with crystals of a hydrate of sodium meta silicate. After a period of time that is dependent upon the rate of heat radiation from the container a marked temperature rise is observed, the mass gradually becomes more viscous, and it finally congeals into a solid mass of approximately the following composition:

| | Per cent |
|---|---|
| $Na_2SiO_3$ | 41.8 |
| NaOCl | 1.7 |
| NaCl | 1.2 |
| Water | 55.3 |

The NaOCl content of this material is equivalent to approximately 1.6 percent of available chlorine.

The solid mass is dry to the touch. It may be crushed to provide free flowing granules which may be screened to desired grain size. It is readily soluble in water to provide an alkaline detergent bath in which there is liberated chlorine to the extent of its available chlorine content. As thus prepared the composition comprises a substantially homogeneous dispersion of solid sodium hypochlorite in solid hydrated sodium silicate. Apparently the hypochlorite exists as crypto-crystalline particles associated with the silicate crystals.

The water content of the meta silicate solutions should be kept substantially within the limits indicated. Too little water renders the solutions undesirably viscous, and too much water gives products containing an excess of moisture.

The concentration of available chlorine in the products may be varied within rather wide limits. A product containing 5.4 percent of available chlorine has been made in the foregoing manner by using a hypochlorite solution prepared by chlorinating a 35 percent solution of sodium hydroxide at 10° C. until it contained 20 percent available chlorine, the precipitated salt being filtered from the solution before using it in the practice of the invention. Higher and lower concentrations of chlorine than those described may also be used, but in general compositions initially containing more than about 0.5 percent of available chlorine are preferred.

The procedure described may be varied by forming the hypochlorite in the solution, as by adding a suitable excess of sodium hydroxide to sodium meta silicate solution, treating the solution with chlorine until it has taken up the desired amount of chlorine, and then crystallizing, or congealing, as described above.

The method described is simple, readily controlled, and economical, and complicated apparatus, skilled labor and precise control are not required. A particular feature of the invention resides in the fact that there are no residual mother liquors or other by-products to be handled and disposed of. Thus, crystallization of the entire mass makes direct use of all of the components entering into the process, which minimizes overhead expense as compared with processes in which mother liquor is an inevitable occurrence. Such mother liquor must be returned to the system, and this involves added analytical and control features, additional floor space and equipment, and is otherwise disadvantageous. Those drawbacks are eliminated by our process.

The invention also provides a material embodying commercially desirable features. In addition to the properties described, and particularly its ready and complete solubility in water to provide clear solutions, the product provided by the invention is stable, enough for commercial purposes. For instance, tests which we have made of products made in the manner described have indicated that when stored in suitable containers its stability is such that a product containing 2 percent of available chlorine would still provide 1 percent of available chlorine after fifty days storage,—a commercially suitable life. The product may be stored in glass, although metal containers are in general preferred.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. A composiiton of matter containing available chlorine and composed of solid crystalline granules of solid alkali metal hypochlorite distributed throughout a crystalline mass of solid hydrated alkali metal silicate, the composition being of substantial stability dry to the touch and readily and substantially completely soluble in water.

2. A composition of matter containing available chlorine and comprising crystallized granules of alkali metal hypochlorite distributed homogeneously through solid hydrated sodium silicate having an $Na_2O:SiO_2$ ratio of substantially 1:1, said mass being of substantial stability dry to the touch and readily and substantially completely soluble in water.

3. A composition of matter containing available chlorine and composed of granules of a crypto-crystalline dispersion of sodium hypochlorite and crystallized sodium meta silicate nonahydrate, the composition being of substantial stability, dry to the touch, readily and substantially completely soluble in water, and containing from about 0.5 to 5.5 percent of available chlorine.

4. A method of making a dry, water soluble composition of matter containing available chlorine comprising heating a solution of sodium silicate to not more than about 50° C., adding thereto a solution of sodium hypochlorite to form a solution containing said silicate and hypochlorite together with about 40 to 60 percent of water, and congealing the entire solution to form a homogeneous solid crystallized mass of said hypochlorite distributed throughout hydrated sodium silicate which is of substantial stability, dry to the touch, and readily and substantially completely soluble in water.

5. A method of making a dry, water soluble composiiton of matter containing available chlorine comprising preparing a solution of sodium silicate having an $Na_2O:SiO_2$ ratio of substantially 1:1, heating said solution to about 50° C., mixing therewith a solution of sodium hypochorite, the proportions of said solutions being adapted to provide a mixed solution containing about 40 to 60 percent of water, and cooling the solution to about 30° C. and seeding it with sodium silicate to congeal the entire solution and form a homogeneous solid crystallized mass of said hypochlorite distributed throughout hydrated sodium silicate which is of substantial stability, dry to the touch, and readily and substantially completely soluble in water.

6. A method of making a dry, water soluble composition of matter containing available chlorine comprising heating a solution of sodium meta silicate to about 50° C., mixing therewith a solution of sodium hypochlorite, the proportions being adapted to provide a solution corresponding to the nonahydrate of sodium meta silicate, and congealing the entire solution to form a crystallized homogeneous solid mass of said hypochlorite distributed throughout hydrated sodium silicate which is of substantial stability, dry to the touch, and readily and substantially completely soluble in water.

HARVEY G. ELLEDGE.
ALFRED HIRSCH.